United States Patent
Frehling

[11] Patent Number: 5,802,758
[45] Date of Patent: Sep. 8, 1998

[54] FISH HOOK SETTING APPARATUS

[76] Inventor: Wayne Frehling, P.O. Box 1077, San Andreas, Calif. 95249

[21] Appl. No.: 687,189

[22] Filed: Jul. 25, 1996

[51] Int. Cl.⁶ .................................................. A01K 97/12
[52] U.S. Cl. .................................................. 43/15; 43/16
[58] Field of Search ................... 43/15, 16, 17, 43/21.2

[56] References Cited

U.S. PATENT DOCUMENTS

| | | | |
|---|---|---|---|
| 2,784,516 | 3/1957 | Barnes | 43/16 |
| 2,784,517 | 3/1957 | Mooney | 43/16 |
| 2,811,801 | 11/1957 | Daniel | 43/16 |
| 2,898,697 | 8/1959 | Housman. | |
| 3,205,606 | 9/1965 | Banta | 43/15 |
| 3,270,457 | 9/1966 | Austin | 43/15 |
| 3,412,499 | 11/1968 | Pastrovich. | |
| 3,451,155 | 6/1969 | Huliew | 43/15 |
| 3,837,109 | 9/1974 | De Julio. | |
| 3,897,646 | 8/1975 | Sheets. | |
| 3,973,346 | 8/1976 | Mason | 43/15 |
| 4,040,197 | 8/1977 | Robbins | 43/15 |
| 4,235,035 | 11/1980 | Guthrie. | |
| 4,391,059 | 7/1983 | Cordova | 43/15 |
| 4,476,645 | 10/1984 | Paarmann. | |
| 4,676,018 | 6/1987 | Kimball | 43/16 |
| 4,920,681 | 5/1990 | Toliver | 43/21.2 |
| 5,050,332 | 9/1991 | Cross. | |
| 5,076,001 | 12/1991 | Coon | 43/15 |
| 5,245,778 | 9/1993 | Gallegos | 43/16 |
| 5,383,298 | 1/1995 | Engel | 43/15 |
| 5,524,376 | 6/1996 | Flisak | 43/15 |

FOREIGN PATENT DOCUMENTS 555966  2/1957  Italy.

Primary Examiner—John Sipos
Assistant Examiner—Christopher W. Day
Attorney, Agent, or Firm—John P. O'Banion

[57] ABSTRACT

A fish hook setting apparatus having a rod holder pivotally mounted on a base. The rod holder moves between a cocked, spring loaded position and an upright resting position. A trigger member is movably coupled to the base and releasibly engages the rod holder while the rod holder is in the cocked position. A plurality of slots for receiving a fishing line are included on the trigger member to allow adjustment and control of trigger sensitivity. A locking mechanism allows the rod holder to be locked in the cocked position while changes in trigger sensitivity or adjustments to a fishing line are made.

17 Claims, 4 Drawing Sheets

FISH HOOK SETTING APPARATUS

BACKGROUND OF THE INVENTION

1. Field of the Invention

This invention pertains generally to devices and methods for catching fish with a fishing pole or line, and more particularly to a fish hook setting apparatus which provides for automatically setting a fishhook in a fish's jaw when a fish strikes or bites at a baited hook or lure on a fishing line.

2. Description of the Background Art

The catching of fish with fishing poles and fishing lines has long been practiced for recreational and commercial purposes. A persistent problem with pole and line fishing generally is that fish are frequently able to remove the bait from a hook on the fishing line without being retained on the hook. Numerous devices and methods have been developed which aid in catching and retaining a fish on a hook with a fishing pole or fishing line. These devices and methods typically employ a spring-loaded fishing rod holder which is triggered or actuated by the action of a fish striking a baited hook, causing the fishing rod to spring or move from a cocked or loaded position in a manner which snags the fish on the hook.

Various drawbacks are associated with previously disclosed fish hooking devices and methods. For example, fish hooking devices typically do not provide for control of trigger sensitivity, or are difficult to adjust for sensitivity, which limits the control of the devices with respect to the action from a particular type or size of fish or for particular weather conditions. Another problem is that the background art fish hooking devices cannot be locked in the cocked or loaded position, and thus the fish hooking device and fishing line cannot be moved or adjusted once the device is set in the cocked position without accidentally springing the device. Previously known devices must either be manually held in the cocked position during movement or adjustment, or must be sprung and then reset after the adjustment is made. Additionally, the absence of locking mechanisms in currently used fish hooking devices can lead to injuries from fish hooks due to premature triggering of the devices when persons attempt to make adjustments to the fishing line while the fish hooking device is cocked. A further problem with currently used devices is that they are complex and include numerous parts which are susceptible to corrosion and failure due to the action of sea water and weather.

Accordingly, there is a need for a fish hook setting apparatus for which the sensitivity can be quickly and easily adjusted, which can be locked in a cocked position, which is simple to manufacture and operate, and which is resistant to weathering and corrosion. The present invention satisfies these needs, as well as others, and generally overcomes the deficiencies found in the background art.

SUMMARY OF THE INVENTION

The present invention pertains to a fish hook setting apparatus which provides a reversible locking mechanism to prevent accidental activation of the apparatus when cocked, and which provides for quick and easy trigger sensitivity adjustment and control. In general terms, the invention comprises a base with a rod or line holder pivotally mounted thereon, bias means for spring loading and actuating the rod holder, a trigger pivotally mounted on the base which detachably engages and holds the rod holder, means for locking the trigger and rod holder in a cocked position, and a plurality of line-receiving slots in the trigger to allow control of the sensitivity of the trigger. Means for mounting the base on a surface or object are preferably associated with the base.

By way of example and not of limitation, the rod holder preferably comprises an elongated tube or hollow cylinder which is structured and configured to receive the handle end of a fishing rod. A pair of brackets on the base hold a pin or rod, and the rod holder is pivotally mounted to the base on the pin. The rod holder pivots or moves between a forward-pointing loaded or cocked position and a resting or upward-pointing position. The bias means preferably comprises a spring associated with the pin and rod holder which is positioned to apply a bias to the rod holder in the direction of the resting position so that the rod holder is "spring-loaded" while in the cocked position. A trigger member is pivotally mounted to the base, preferably on an arm extending forward from the base. A notch in the trigger releasibly accommodates a roller bushing on the rod holder while the rod holder is in the cocked position. The lock means preferably comprises a hook-shaped lock member pivotally mounted on the trigger adjacent to the notch. The hook-shaped lock member can be moved to a locking position to retain the roller bushing on the rod holder within the notch on the trigger member when the rod holder is in the cocked position, thereby preventing the rod holder from returning to the resting position. Moving the lock member to an unlocked position allows the roller bushing to disengage from the notch when the trigger member is actuated. The line-receiving slots on the trigger are structured and configured to releasibly hold a fishing line. The mounting means preferably comprises a ground spike or clamp assembly for a railing which is attached to the base.

The invention is utilized by mounting the base on the ground with the ground spike. The baited hook or lure at the end of a fishing line is cast or placed into the water in a conventional fashion, and the handle end of the fishing pole is inserted into the rod holder while the rod holder is in the resting position. The rod holder is moved from the resting position to the cocked position, applying tension to the spring, and the trigger is positioned so that the roller bushing on the rod holder fits within the notch on the trigger. The fishing line is looped about the trigger and inserted in a selected slot according to the desired trigger sensitivity. When a fish strikes at the baited hook or lure, the fishing line pulls the trigger forward, disengaging the roller bushing from the notch on the trigger, and allowing the rod holder to spring back to the resting position from the cocked position under the action of the spring. The rod holder jerks the fishing pole and fishing line back as the rod holder returns to the resting position, and the motion of the rod holder sets the hook in the mouth of the striking fish.

The lock means allows the user of the invention to temporarily lock the rod holder in the cocked position while the user of the invention loops the fishing line about the trigger and chooses a particular line-receiving slot for trigger sensitivity. After the trigger is set at the desired sensitivity, the lock means is unlocked to allow a striking fish to actuate the trigger and spring the rod holder. Thus, accidental or premature triggering of the apparatus to release the rod holder from the cocked position is avoided. The lock means may also be used to lock the rod holder in the cocked position while the user of the invention adjusts the length of the fishing line or subsequently adjusts or changes the trigger sensitivity by moving the fishing line to a different slot on the trigger. The plurality of line-receiving slots allow a range of trigger sensitivities according to particular fishing objectives or conditions.

An object of the invention is to provide a fish hook setting apparatus which can be temporarily locked in a cocked or spring-loaded position to allow adjustment to the fishing line or to the apparatus while in the cocked position.

Another object of the invention is to provide a fish hook setting apparatus which avoids injuries from fish hooks.

Another object of the invention is to provide a fish hook setting apparatus which allows quick and easy adjustment of trigger sensitivity.

Another object of the invention is to provide a fish hook setting apparatus wherein trigger sensitivity can be adjusted while the apparatus is locked in a cocked position.

Another object of the invention is to provide a fish hook setting apparatus which is of relatively simple construction and does not include parts which are easily subject to wear and corrosion.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
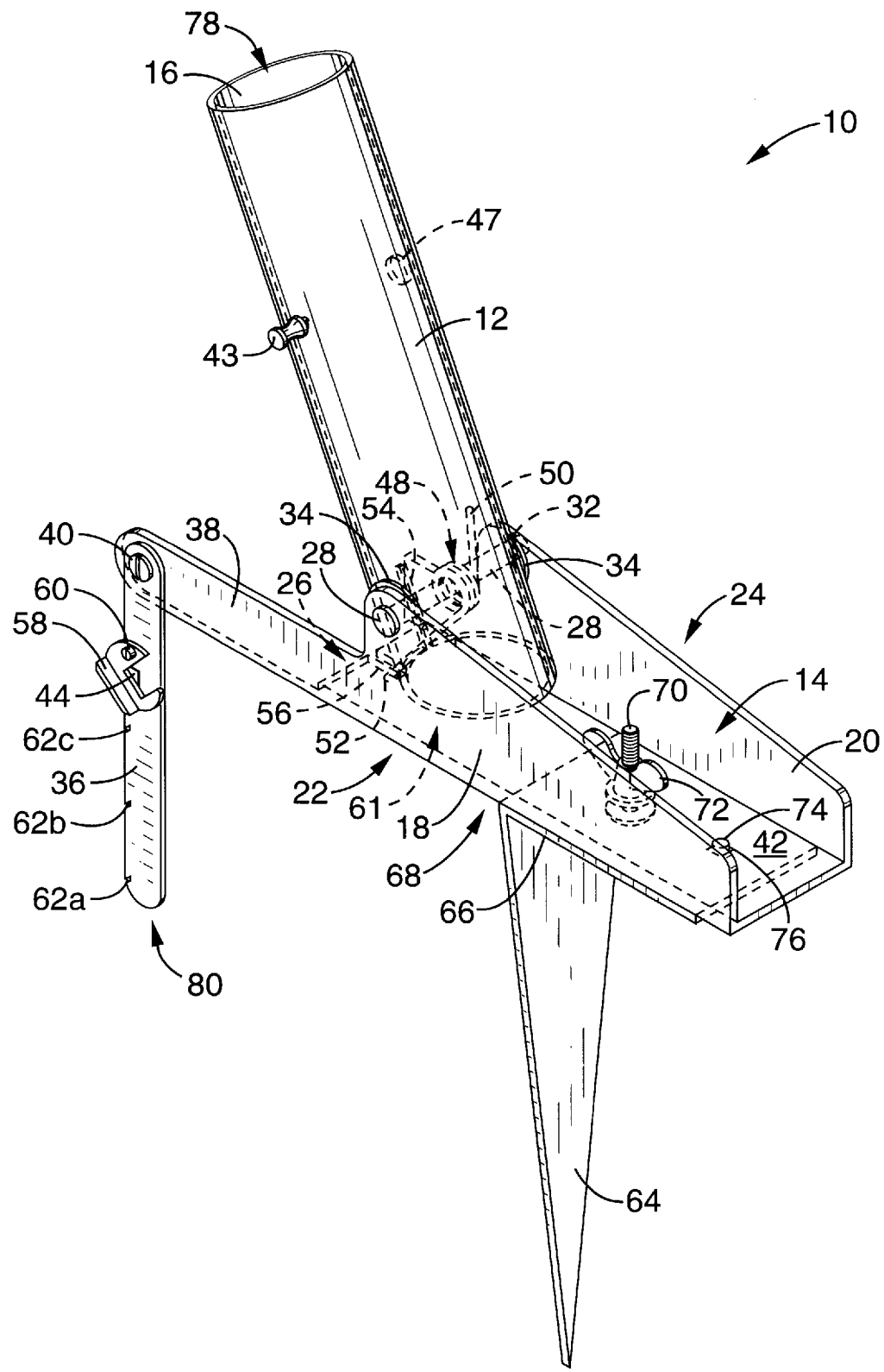
FIG. 1 is a perspective view of a fish hook setting apparatus in accordance with the present invention.

Referring more specifically to the drawings, for illustrative purposes the present invention is embodied in the apparatus generally shown in FIG. 1 through FIG. 5. It will be appreciated that the apparatus may vary as to configuration and as to details of the parts without departing from the basic concepts as disclosed herein.

Referring first to FIG. 1 through FIG. 4, a fish hook setting apparatus 10 in accordance with the invention is generally shown. The apparatus 10 includes a rod holder or rod support 12 which is movably mounted to a base 14. Rod holder 12 is preferably of tubular or hollow cylindrical shape and includes an internal bore 16 which is structured and configured to receive the handle or base of a conventional fishing rod (not shown). The term "rod holder" is used generically herein to refer to all conventional means for holding or supporting a fishing pole or like arrangements which employ a baited hook or lure at the end of a fishing line. Thus, rod holder 12 may alternatively comprise a clamp or bracket assembly which is structured and configured to hold a fishing pole handle or a coil or spool of fishing line.

Figure 2:
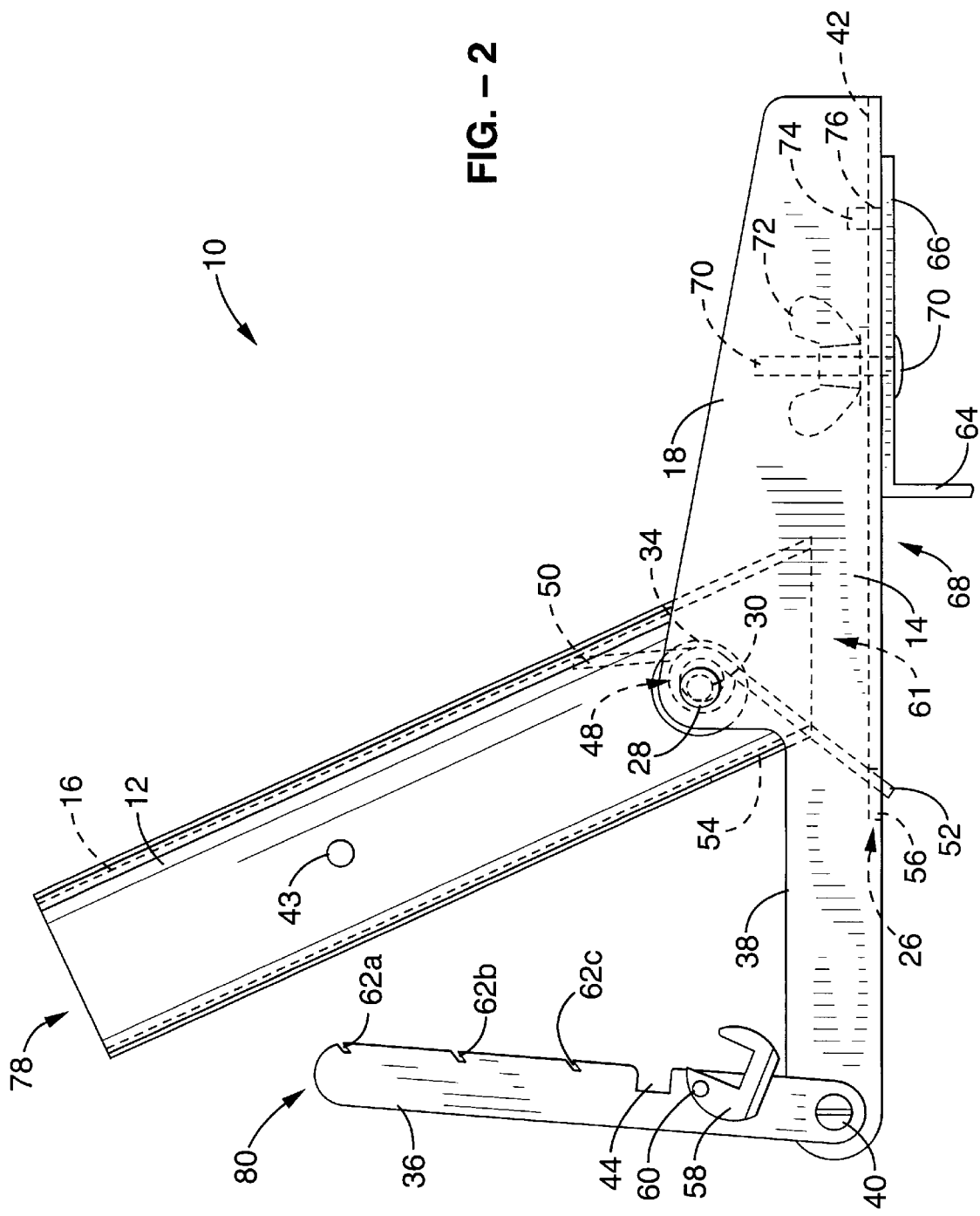
FIG. 2 is a side elevation view of the fish hook setting apparatus of FIG. 1 showing the rod holder in the resting position and the trigger member pivoted to an upright position.
Figure 3:
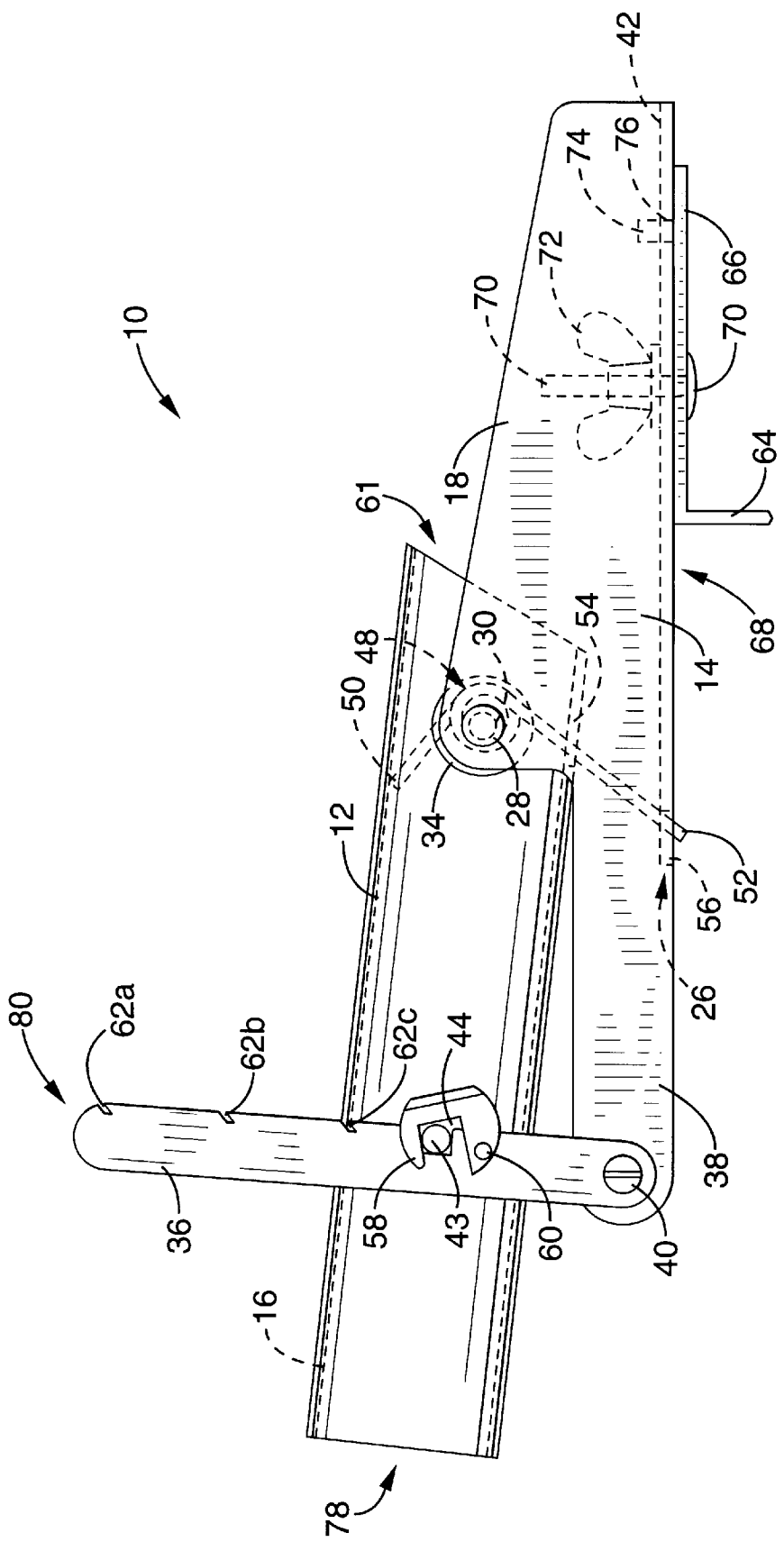
FIG. 3 is a side elevation view of the fish hook setting apparatus of FIG. 1 showing the rod holder locked into the cocked position.

Base 14 is preferably of flat, rectangular structure and configuration as shown, although the general shape of base 14 may be varied as required for particular applications of the invention. Base 14 preferably includes a pair of upwardly disposed brackets or shoulders 18, 20 on sides 22, 24 respectively of base 14, and adjacent front end 26 of base 14. Shoulders 18, 20, which extend for the length of base 14, support a pin or rod 28. Shoulders 18, 20 also provide a barrier which prevents the user's fingers from being pinched by rod holder 12. Rod holder 12 is pivotally mounted on pin 28 via holes 30 in the sides of rod holder 12, with pin 28 extending through holes 30 and through bore 16 of rod holder 12. A key 32 holds pin 28 in place on shoulders 18, 20, and fabric washers 34 are included between the surfaces of shoulders 18, 20 and surface of rod holder 12 to reduce friction therebetween and avoid scratching the finish on rod holder 12 and shoulders 18, 20. Rod holder 12 pivotally moves on pin 28 between a generally upright or resting position as shown in FIG. 1 and FIG. 2, and a forward or "cocked" position, as shown in FIG. 3. While in the cocked position, rod holder 12 is in a substantially horizontal orientation or is substantially parallel to base 14, and while in the upright, resting or unloaded position, rod holder 12 is in a substantially vertical orientation or is substantially perpendicular to base 14, as seen most clearly in FIG. 2 and FIG. 3.

A trigger member 36 is movably coupled to base 14, preferably by means of a forwardly disposed arm 38 attached to base 14, with trigger member 36 pivotally mounted on arm 38 by a screw or bolt 40. Arm 38 is preferably positioned adjacent shoulder 18 and side 22 of base 14, so that trigger member 36 pivots about screw 40 along an arc which lies in a plane that is generally beside rod holder 12 and perpendicular to the flat upper surface 42 of base 14. Trigger member 36 is structured and configured to releasibly engage rod holder 12 while rod holder 12 is in the cocked position.

Figure 4:
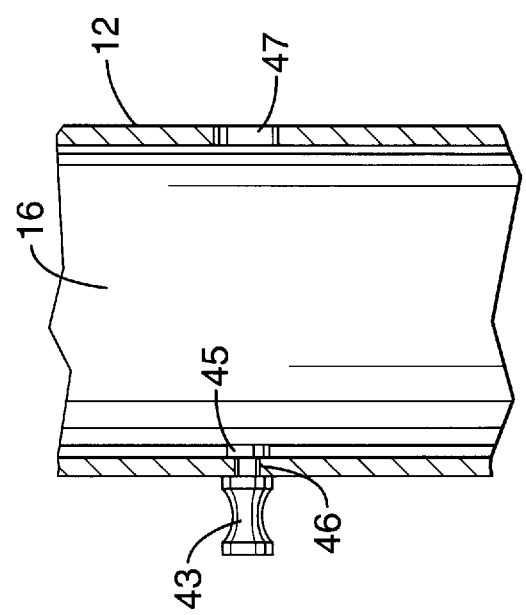
FIG. 4 is a detail view of the roller bushing shown with a portion of the rod holder in cross-section.

Preferably, a roller bushing 43 is provided on the side of rod holder 12, and a notch or socket 44 is provided in trigger member 36. Notch 44 and roller bushing 43 are suitably positioned so that, while rod holder 12 is in the cocked position, trigger member 36 can be pivotally positioned in order to engage roller bushing 43 into notch 44, thereby allowing trigger member 36 to hold rod holder 12 in the cocked position, with roller bushing 43 retained in notch 44. Referring more particularly to FIG. 4, roller bushing has a generally convex or hour-glass-like shape to facilitate engagement of roller bushing 43 into notch 44. Roller bushing 43 is rotatably mounted and spins freely on screw 45 which extends through bore 46 in the side of rod holder 12. The convex shape and rotational mounting of roller bushing 43 facilitate disengagement of roller bushing 43 from notch 44 when a fish strikes, as discussed below. Screw 45 includes threading (not shown) which is structured and configured to allow roller bearing 43 to be threaded onto screw 45 and retained thereon in a freely rotating manner. An opening 47 is included on rod holder 12 opposite screw 45 to provide access for a screw driver or like tool to reach screw 45.

Preferably, notch 44 is located on trigger member 36 so that when trigger member 36 is in a vertical, upwardly disposed orientation relative to arm 38 and base 14, notch 44 is generally facing or oriented towards rod holder 12 and roller bushing 43. Thus, trigger member 36 is in a generally upright position when roller bushing 43 is engaged in notch 44 as shown in FIG. 3. When roller bushing 43 is not engaged in notch 44, trigger member 36 will generally dangle from arm 38 in a downwardly disposed orientation as shown in FIG. 1. Different triggering mechanisms may be utilized in association with trigger member 36 and rod holder 12 if desired. For example, a stud, loop, bail or other projection may be used in place of roller bushing 43, and a suitable notch, clip mechanism, or other releasible fastening means for receiving the stud or loop may be included on trigger member 36. Additional conventional triggering mechanisms which will suggest themselves to those of ordinary skill in the art are also considered to be within the scope of this disclosure.

The invention includes bias means for spring loading the rod holder 12 in the cocked position so that rod holder 12 will automatically move or spring back to the upright, unloaded or resting position when released. The bias means preferably comprises a spring 48 which is suitably positioned to apply a force to rod holder 12 which induces rod holder 12 to move to the upright or resting position absent application of a counteracting force. Spring 48 is preferably located within bore 16 of rod holder 12 and associated with or coiled about pin 28. A first or upper end 50 of spring 48 is positioned to apply force to rod holder 12, and a second or lower end 52 of spring 48 extends out through a slot 54 in rod holder 12. Lower end 52 of spring 48 is held within a slot 56 in the front end 26 of base 14. Slot 56 is centrally located in the front end 26 of base 14 to keep spring 48 optimally positioned within rod holder.

Means for releasibly locking rod holder 12 in the cocked or loaded position are provided with the invention, and preferably comprise a hook-shaped lock member 58 which is pivotally attached to trigger member 36 adjacent notch 44 by a screw or bolt 60. Lock member 58 pivots or moves about screw 60 between a locking position, shown in FIG. 3, wherein notch 44 is covered or enclosed by lock member, and an open or unlocked position, shown in FIG. 2, wherein lock member 58 is positioned so that notch 44 is open or exposed. While lock member 58 is in the unlocked position, notch 44 can receive roller bushing 43 on rod holder 12 when rod holder 12 is in the cocked position. By pivotally moving lock member 58 to the locked position while roller bushing 43 is engaged in notch 44, roller bushing 43 is prevented from disengaging from slot 44, and rod holder 12 is thereby locked in the cocked position.

Preferably, tension or traction generating means (not shown) are included in association with lock member 58 and bolt 60 so that lock member 58, while pivotally mounted on bolt 60, does not freely spin thereon but instead pivots relative to bolt 60 and trigger member 36 only when a force is applied to lock member 58 by a user to adjust the position of lock member 58. Thus, lock member 58 will remain in the locked or unlocked position once the user has so positioned lock member 58, until force is applied to lock member 58 by the user to change its position. Such tension or traction generating means is desirable since lock member 58 may otherwise inadvertently move from the locked position when the user of the invention wishes to keep rod holder locked in the cocked position. Additionally, roller bushing 43, which spins freely on screw 45 to allow facile triggering of the apparatus 10, can disengage slot 44 if lock member pivots too freely about bolt 60. The tension or traction generating means may comprise a ratchet mechanism (not shown) wherein bolt 60 is fixedly mounted on trigger member 36, and a plurality of teeth (not shown) encircle the circumference of bolt 60 and inter-engage and enmesh with a corresponding plurality of teeth (not shown) in the portion of lock member 58 which receives bolt 60, so that, when lock member 58 is pivoted about bolt 60, the inter-engaging teeth must disengage and move relative to each other in a ratcheting fashion. The tension or traction generating means may alternatively comprise a lock washer (not shown) or like hardware which allow lock member 58 to pivot on bolt 60 upon application of force by a user to lock member 58, but which prevents lock member 58 from spinning freely on bolt.

The present invention also includes a plurality of angled slots 62a, 62b and 62c in trigger member 36, with slots 62a–62c each structured and configured to receive a conventional fishing line. Slots 62a–62c preferably are angled in generally diagonal orientation relative to the long axis of trigger 36. When trigger member 36 is moved to the upwardly disposed orientation shown in FIG. 2 and FIG. 3, slots 62 open towards rod holder 12 and angle generally downward from the outside edge of trigger member 36 into the interior of trigger member 36. Selection of a particular slot 62a–62c allows the sensitivity of trigger member 36 to be controlled, as discussed below, with slot 62a providing the greatest sensitivity, and slot 62c providing the least. A larger number of line receiving slots may be included on trigger member if desired to provided a greater range of possible trigger sensitivities.

Surface mounting means for attaching base 14 to a surface or object are preferably included with the invention. The surface mounting means is shown as a ground spike 64 with a top plate 66 which detachably couples to the lower surface 68 of base 14 by bolt 70 and wing-nut 72. A boss or projection 74 in top plate 66 fits within opening 76 in base 14 and prevents unwanted rotation of ground spike 64 relative to base 14 during use of the invention. Ground spike 64 may alternatively be replaced by a clamp mechanism (not shown) to allow base 14 to be mounted or attached onto the gunwale or other portion of a boat, a pier railing, or other structure.

The fish hook setting apparatus 10 is utilized by forcing the ground spike 64 into the ground adjacent a fishing location to secure the apparatus 10 to the ground. A fishing pole (not shown) is prepared in a standard manner, i.e., by baiting one or more hooks on a fishing line and casting the line into the water. The handle of the fishing pole is then inserted into the upper end 78 of rod holder 12 and into the hollow interior 16. Force is applied to the rod holder 12 to overcome the bias of spring 48 and pivotally move rod holder 12 into the loaded or cocked position. While the rod holder 12 is in the cocked position, trigger member 36 is pivotally moved about bolt 40 and positioned so that roller bushing 43 on rod holder 12 fits within notch 44 in trigger member 36. When the force is removed from rod holder 12, roller bushing 43 is retained within notch 44, and rod holder 12 will remain in the cocked position until the trigger member 38 is moved forward, allowing roller bushing 43 to slip out of notch 44 and thereby allowing rod holder 12 to spring back to the upright, unloaded position. While roller bushing 43 is positioned within notch 44, the fishing line (not shown) is looped about trigger member 36 and inserted into the desired line-receiving slot 62–62c. When a fish strikes the hook on the line, the line jerks trigger member 36 forward, causing roller bushing 43 to slip out of notch 44, and rod allowing rod holder 12 to spring back to the upright, unloaded position. The motion of rod holder 12 jerks the fishing pole and sets the hook at the end of the line into the jaw of the striking fish.

Trigger sensitivity is adjusted or controlled according to particular fishing objectives or weather conditions by selecting a particular slot 62–62c on trigger member 36 for the fishing line. Placing the fishing line within slot 62a which is closest to the end 80 of trigger member 36 provide greater or heightened trigger sensitivity, while slot 62c furthest from end 80 provide reduced trigger sensitivity. Slot 62b furnishes a trigger sensitivity which is intermediate relative to that provided by slots 62a, 62c. Before looping the fishing line about trigger member 36, lock member 58 is preferably moved to the locked position as described above to lock roller bushing 43 within slot 44 and prevent rod holder 12 from accidentally springing back to the upright position while the user of the invention is looping the fishing line about trigger member 36.

The lock means of the present invention allows persons using the fish hook setting apparatus 10 to make adjustments to the fishing line or to move the fishing line to a different slot 62a–62c in trigger member 36 for sensitivity adjustment without risk of unwanted activation of rod holder 12. As mentioned above, previously used fishing pole holder and fish hooking devices have not provided any manner of locking a pole holder in a cocked position, and thus in order to make adjustments or changes to the length of fishing line or to re-bait a hook, the devices must first be released or "sprung" to un-cock the rod holder, and then the devices must be reset in the cocked position after the adjustment is made. Attempting to make such adjustments without first springing the devices creates a risk of injury to persons due to rapidly moving fish hooks when the devices are accidentally sprung. When the user of the present invention desires to make such an adjustment, however, the user applies force by hand to lock member 58 to simply pivot lock member 58 to the locked position to lock roller bushing 43 within slot 44 prior to making the adjustment, thereby avoiding unwanted or accidental activation of rod holder during the adjustment. After the adjustment has been made, lock member 58 is manually moved back to the unlocked position, allowing roller bushing 43 to disengage from notch 44 when a fish strikes.

Figure 5:
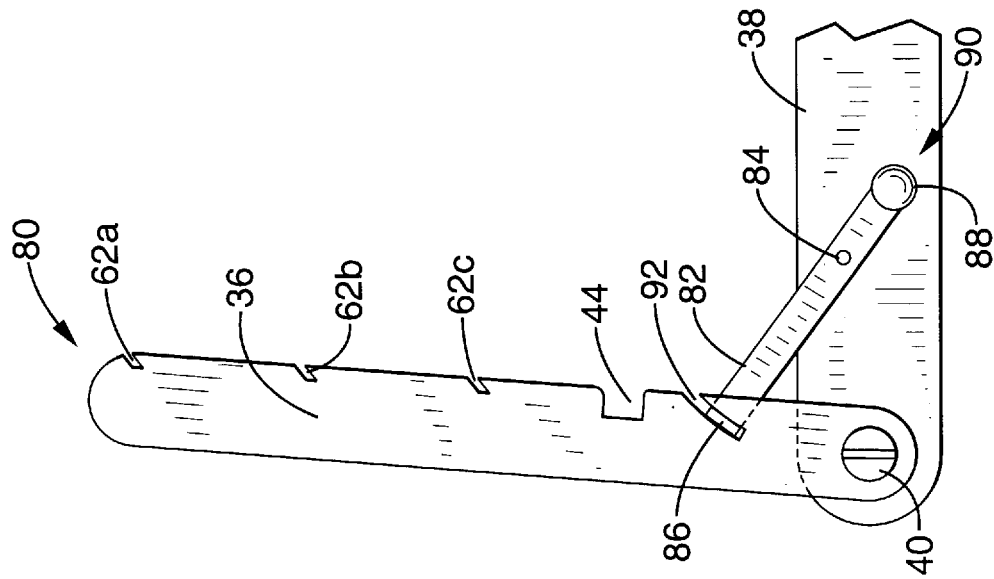
FIG. 5 is a side elevation view of the forward arm and trigger member shown with an alternative embodiment of the locking means of the invention.

Referring now to FIG. 5, an alternative embodiment of the locking means of the invention is shown, wherein like reference numerals denote like parts. The locking means of FIG. 5 comprises a lock arm 82 pivotally mounted on forward arm 38 by a pin or bolt 84. Lock arm 82 includes a first end 86 which is angled or bent so that it is generally perpendicular or at a right angle to lock arm 82 and serves as a hook. Lock arm 82 includes a knob 88 at a second end 90 to facilitate handling of lock arm 82. An angled slot 92 is included in trigger member which is structured and configured to receive the angled first end 86 of lock arm. In order to lock trigger member 36 in a vertical position as shown, lock arm 82 is pivotally moved on bolt 84, preferably by manipulation of knob 88, so that angled first end 86 is positioned or hooked within slot 92 in trigger member 36. When the roller bushing (not shown) on the rod holder (not shown) is inserted into notch 44 on trigger member as described above to hold the rod holder in the cocked position, the rod holder is locked in the cocked position by the angled first end 86 of lock arm 82 which is hooked within slot 92. Trigger member 36 (and thus the rod holder) can be unlocked by moving lock arm 82 such that angled first end 86 disengages, releases or unhooks slot 92.

Referring also to FIG. 1 through FIG. 4, as well as FIG. 5, the locking means of the invention are preferably associated with trigger member 36 and/or forward arm 38, but may alternatively be located on shoulder 18 or 20, or base 14, and positioned in a manner to releasibly hold rod holder 12 in the cocked position. For example, a pin (not shown) may be used to engage a hole or holes (not shown) near the bottom end 61 of rod holder 12 when rod holder is in the cocked position. The pin thus engaged would be held against shoulders 18, 20 by the action of spring 48, and would prevent rod holder 12 from returning to the upright or resting position until the pin was removed. Other conventional locking arrangements will suggest themselves to persons of ordinary skill in the art, and are also considered to be within the scope of the lock means of this disclosure.

Accordingly, it will be seen that this invention provides a fish hook setting apparatus having a reversible locking mechanism to prevent accidental activation of the apparatus when cocked, and which allows quick and easy trigger sensitivity adjustment and control. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A fish hook setting apparatus, comprising:
   (a) a base;
   (b) a rod holder pivotally coupled to said base wherein said rod holder pivots between a cocked position and a resting position, said rod holder for receiving a fishing rod having a fishing line with a hook attached at an end of said line;
   (c) bias means for spring-loading said rod holder in said cocked position;
   (d) a roller bushing rotatable disposed on said rod holder so as to allow for triggering of the fish hook setting apparatus;
   (e) a trigger member pivotally coupled to said base, said trigger member including a notch structured and configured to receive said roller bushing, whereupon receipt of said roller bushing within said notch places said rod holder in said cocked position, said trigger member including means for releasably engaging said rod holder when said rod holder is in said cocked position such that said trigger member is disengageable by tension in said fishing line caused by a fish biting on said hook, wherein said rod holder is biased toward said resting position upon activation of said trigger member; and
   (f) means for releasably locking said rod holder in said cocked position, said locking means connected to said trigger member so as to selectively prevent inadvertent release of the trigger member.

2. A fish hook setting apparatus as recited in claim 1, wherein said trigger member includes line-receiving slot means for adjusting the sensitivity of said trigger member.

3. A fish hook setting apparatus as recited in claim 2, wherein said line-receiving slot means comprises a plurality of slots on said trigger member, said slots structured and configured to releasably receive a fishing line, said slots forming an acute angle relative to a longitudinal axis of said trigger member.

4. A fish hook setting apparatus as recited in claim 1, further comprising means for attaching said base to a support member.

5. A fish hook setting apparatus as recited in claim 1, wherein said locking means comprises:
   (a) a lock arm pivotally mounted on said forward member, said lock arm including an angled first end; and
   (b) an angled slot included on said trigger member, said angled slot structured and configured to receive said angled first end of said lock arm;
   (c) wherein said lock arm is moveable between a locking position and an unlocking position whereby said angled first end is disposed within said angled slot when said lock arm in said locking position.

6. A fish hook setting apparatus as recited in claim 1, wherein said lock means comprises a hook-shaped lock member, said lock member pivotally coupled to said trigger member adjacent said notch, said lock member moving between a locking position and an unlocked position, said lock member structured and configured to retain said roller bushing within said notch when said lock member is in said locking position.

7. A fish hook setting apparatus as recited in claim 1, wherein said base further comprises a forwardly disposed arm adjacent a front end of said base, said trigger member pivotally mounted on said forwardly disposed arm.

8. A fish hook setting apparatus, comprising:
   (a) a base;
   (b) a rod holder pivotally coupled to said base wherein said rod holder pivots between a cocked position and a resting position, said rod holder for receiving a fishing rod having a fishing line with a hook attached at an end of said line;
   (c) bias means for spring-loading said rod holder in said cocked position;
   (d) a roller bushing rotatably disposed on said rod holder so as to allow for triggering of the fish hook setting apparatus;
   (e) a trigger member pivotally coupled to said base, said trigger member including a notch structured and configured to receive said roller bushing, whereupon receipt of said roller bushing within said notch places said rod holder in said cocked position, said trigger member including means for releasably engaging said rod holder when said rod holder is in said cocked position such that said trigger member is disengageable by tension in said fishing line caused by a fish biting on said hook, wherein said rod holder is biased toward said resting position upon activation of said trigger member;
   (f) said trigger member including line-receiving slot means for adjusting sensitivity for activation of said trigger member; and
   (g) means for releasably locking said rod holder in said cocked position, said locking means connected to said trigger member so as to selectively prevent inadvertent release of the trigger member.

9. A fish hook setting apparatus as recited in claim 8, further comprising means for attaching said base to a support member.

10. A fish hook setting apparatus as recited in claim 8, wherein said locking means comprises:
   (a) a lock arm pivotally mounted on said forward member, said lock arm including an angled first end; and
   (b) an angled slot included on said trigger member, said angled slot structured and configured to receive said angled first end of said lock arm;
   (c) wherein said lock arm is moveable between a locking position and an unlocking position whereby said angled first end is disposed within said angled slot when said lock arm in said locking position.

11. A fish hook setting apparatus as recited in claim 8, wherein said locking means comprises a hook-shaped lock member, said lock member pivotally coupled to said trigger member adjacent said notch, said lock member moving between a locking position and an unlocked position, said lock member structured and configured to retain said roller bushing within said notch when said lock member is in said locking position.

12. A fish hook setting apparatus as recited in claim 8, wherein said line-receiving slot means comprises a plurality of slots on said trigger member, said slots structured and configured to releasably receive a fishing line; said slots forming an acute angle relative to a longitudinal axis of said trigger member.

13. A fish hook setting apparatus as recited in claim 8, wherein said base further comprises a forwardly disposed arm adjacent a front end of said base, said trigger member pivotally mounted on said forwardly disposed arm.

14. A fish hook setting apparatus, comprising:
   (a) a base, said base including a forwardly disposed arm, said arm positioned on a side of said base;
   (b) a rod holder for receiving a fishing rod having a fishing line with a hook attached at an end of said line, said rod holder pivotally coupled to said base, said rod holder moving between a cocked position and a resting position, said rod holder including a roller bushing rotatably disposed on said rod holder so as to allow for triggering of the fish hook setting apparatus;
   (c) bias means for spring-loading said rod holder in said cocked position;
   (d) a trigger member disengageable by tension in said line caused by a fish biting on said hook, said trigger member pivotally coupled to said forwardly disposed arm on said base, said trigger member including a notch, said notch positioned to releasably engage said roller bushing on said rod holder when said rod holder is in said cocked position, wherein said rod holder is biased toward said resting position upon activation of said trigger member;
   (e) means for releasably locking said rod holder in said cocked position, said locking means included on said trigger member so as to selectively prevent inadvertent release of the trigger member; and
   (f) said trigger member including a plurality of slots, said slots structured and configured to receive said fishing line, said slots forming an acute angle relative to a longitudinal axis of said trigger member.

15. A fish hook setting apparatus as recited in claim 14, further comprising means for attaching said base to a support member.

16. A fish hook setting apparatus as recited in claim 14, wherein said lock means comprises a hook-shaped lock member, said lock member pivotally coupled to said trigger member adjacent said notch, said lock member moving between a locking position and an unlocked position, said lock member structured and configured to retain said roller bushing within said notch when said lock member is in said locking position.

17. A fish hook setting apparatus as recited in claim 15, wherein said lock means comprises:
   (a) a lock arm pivotally mounted on said forward member, said lock arm including an angled first end; and
   (b) an angled slot included on said trigger member, said angled slot structured and configured to receive said angled first end of said lock arm;
   (c) wherein said lock arm is moveable between a locking position and an unlocking position whereby said angled first end is disposed within said angled slot when said lock arm in said locking position.

* * * * *